US006983485B1

(12) United States Patent
Offer

(10) Patent No.: US 6,983,485 B1
(45) Date of Patent: Jan. 3, 2006

(54) METHOD AND APPARATUS FOR AUTHENTICATION FOR A MULTIPLICITY OF SERVICES

(75) Inventor: Gero Offer, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 993 days.

(21) Appl. No.: 09/621,432

(22) Filed: Jul. 21, 2000

(30) Foreign Application Priority Data

Jul. 21, 1999 (DE) ................................. 199 34 278

(51) Int. Cl.
*H04L 9/00* (2006.01)

(52) U.S. Cl. .......................... 726/4; 726/15; 713/170; 713/182

(58) Field of Classification Search ................ 713/201, 713/202, 153, 155, 159, 161, 169, 170, 182–186; 380/248, 255, 257, 264, 280; 709/203, 223, 709/224, 225, 229, 244; 705/71, 72, 76
See application file for complete search history.

(56) References Cited

U.S. PATENT DOCUMENTS

| 5,553,130 | A | * | 9/1996 | Turner ................... 379/221.08 |
| 5,771,291 | A | * | 6/1998 | Newton et al. ............. 713/185 |
| 5,867,495 | A | * | 2/1999 | Elliott et al. ................. 370/352 |
| 5,999,610 | A | * | 12/1999 | Lin et al. ................ 379/207.02 |
| 6,005,870 | A | * | 12/1999 | Leung et al. ................ 370/466 |
| 6,044,349 | A | * | 3/2000 | Tolopka et al. ................ 705/1 |
| 6,138,238 | A | * | 10/2000 | Scheifler et al. ............. 713/200 |
| 6,466,977 | B1 | * | 10/2002 | Sitaraman et al. .......... 709/225 |

FOREIGN PATENT DOCUMENTS

WO 98/41038 9/1998

OTHER PUBLICATIONS

Refik Molva et al.: "Strong Authentication in Intelligent Networks", *International Conference on Universal Personal Communications, IEEE, New York, Sep. 27, 1994, pp. 629-634, XP-002104730.*

* cited by examiner

*Primary Examiner*—Kambiz Zand
(74) *Attorney, Agent, or Firm*—Laurence A. Greenberg; Werner H. Stemer; Ralph E. Locher

(57) ABSTRACT

A method is provided for authentication for a multiplicity of services, where each service is called via a service-specific and/or subscriber-specific access authorization, and for authentication in an intelligent network for a multiplicity of IN services. The corresponding apparatus for authentication for a multiplicity of services has an authentication server with a memory and a comparison device that compares an authorization input with a stored access authorization.

6 Claims, 2 Drawing Sheets

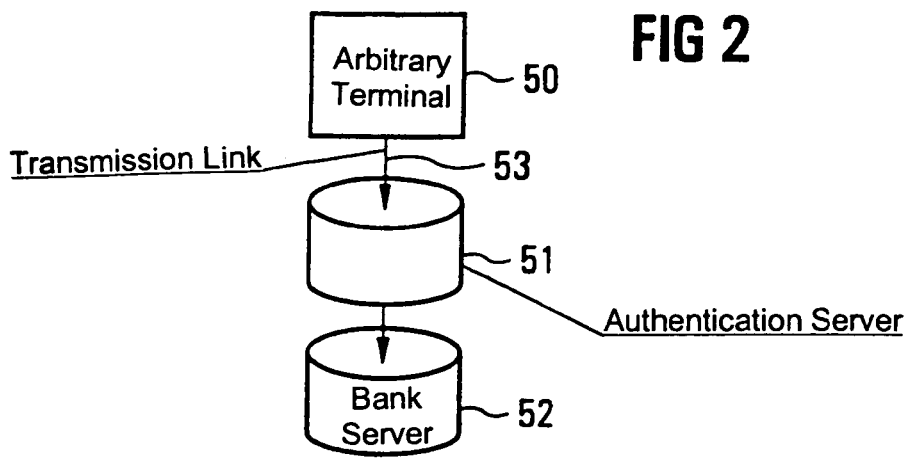
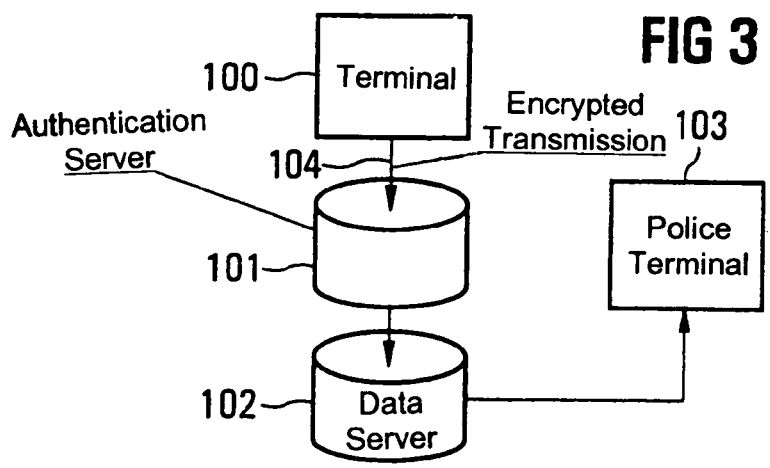
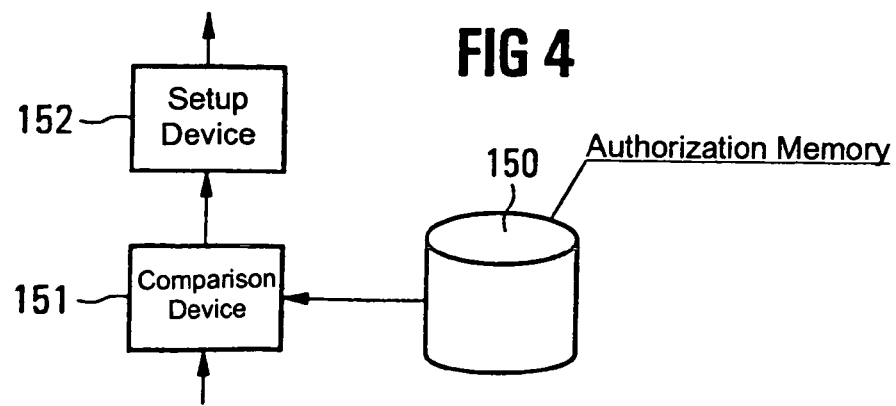

METHOD AND APPARATUS FOR AUTHENTICATION FOR A MULTIPLICITY OF SERVICES

BACKGROUND OF THE INVENTION

Field of the Invention

The invention relates to a method for authentication for a multiplicity of services and to a method for universal authentication in an intelligent network for a multiplicity of IN services. Furthermore, the invention also pertains to an apparatus for authentication for a multiplicity of services.

Nowadays many people use a wide variety of services for which access authorization is required. The following are typical examples: telecommunications services such as access to a database, the Internet, mobile telecommunications services, and electronic banking services. Virtually all of these services require access authorization in the form of a password, a PIN (personal identification number) or a person-specific card such as a credit card, an automatic teller machine card, or a mobile telephone card.

Notes of passwords or PINs constitute a security risk. Accordingly, every person is required to remember the access authorizations assigned to him/her and keep safe access cards such as company passes, bank cards, and the like. Small electronic databases in the form of a pocket computer in which the passwords and PINs can be stored are available precisely for the purpose of managing a large number of passwords and PINS. The information stored in such a database is in turn protected by a password or PIN in order to prevent unauthorized access to these security-relevant data. The database owner need then only remember the password or the PIN for access to the information stored in the database. However, when accessing a service, the database owner must first call up the access authorization for the service from his/her database and then type it manually into, for example, an access terminal for the service. This is furthermore very laborious and affords the database owner merely the advantage that he/she does not have to remember as many access authorizations. Moreover, all the access authorizations are present locally in combined form, so that security against fraud or misuse by hackers, for example, is not ensured.

SUMMARY OF THE INVENTION

The object of the invention is to provide a method and apparatus for authentication of a multiplicity of services and for universal authentication in an intelligent network which overcomes the above-noted deficiencies and disadvantages of the prior art devices and methods of this kind, and which make it easier for a user to access a multiplicity of services.

With the above and other objects in view there is provided, in accordance with the invention, a method of authenticating for a multiplicity of services each being callable via a service-specific and/or subscriber-specific access authorization, the method which comprises the following steps:

providing an authentication server and storing in the authentication server at least one service-specific and/or subscriber-specific access authorization for a service;
storing a multiplicity of authentication codes assigned to users in the authentication server;
assigning each authentication code to the access authorization or authorizations of a user; and
upon receiving a request for a given service, carrying out authentication with the authentication server by comparing a received authentication code with the authentication codes stored in the authentication server and, if the comparison leads to a positive comparison result, causing with the authentication server a connection to the requested service to be set up.

In other words, each of the services is called via a service-specific and/or subscriber-specific access authorization. An authentication server is provided, at least one service-specific and/or subscriber-specific access authorization for a service is stored in the authentication server, a multiplicity of authentication codes assigned to users are stored in the authentication server, each authentication code is assigned to the service-specific and/or subscriber-specific access authorization or authorizations of a user, and in the event of a service being requested, the authentication server carries out authentication by means of a received authentication code in such a way that the received authentication code is compared with all the authentication codes stored in the authentication server and the central authentication server sets up a connection to the requested service if the comparison result is positive.

In this method it is advantageous that all the access authorizations of a user for a multiplicity of services are stored centrally in an authentication server. In this case, the authentication server may be part of a telecommunications network and be dialed up, for example, by a user for use of particular services of the telecommunications network via a number provided for this purpose. As soon as a connection exists between a subscriber terminal of the user and the authentication server, the user can request one of the particular services of the telecommunications network for example by inputting a service-specific code. To that end, the service-specific code may be formed as part of a call number for setting up a connection to the authentication server or the authentication server has "prompt & collect" functionality, in which a service-specific code is communicated by the user and the user thereupon authenticates himself/herself by transmitting his/her authentication code. The authentication code corresponds, as it were, to a central access key to the individual access authorizations for services. The user thus requires only the authentication code in order to request services. In order to increase the security, the transmission of the authentication code to the authentication server may additionally by encrypted, in particular with respect to time.

With the above and other objects in view there is also provided, in accordance with the invention, a method for universal authentication in an intelligent network for a multiplicity of IN services each callable via a service-specific and/or subscriber-specific access authorization. The method comprises the following steps:

providing an authentication server in a service control point of an intelligent network;
storing at least one access authorization for an IN service in the authentication server;
storing a multiplicity of authentication codes assigned to users in the authentication server;
assigning each authentication code to the access authorization or authorizations of a user; and
upon receiving a request for an IN service, comparing with the authentication server a received authentication code with the authentication codes stored in the authentication server and, if the comparison leads to a positive comparison result, causing with the authentication server a connection to the requested service to be set up.

In the context, therefore, of the intelligent network and its IN services, the authentication server is provided in a service control point of the intelligent network. At least one service-specific and/or subscriber-specific access authorization for an IN service is stored in the authentication server, a multiplicity of authentication codes assigned to users are stored in the authentication server, each authentication code is assigned to the service-specific and/or subscriber-specific access authorization or authorizations of a user, in the event of an IN service being requested, the authentication server carries out authentication by means of a received authentication code in such a way that the received authentication code is compared with all the authentication codes stored in the authentication server and the authentication server sets up a connection to the requested IN service in the event of a positive comparison result.

There is further provided, in accordance with the invention, an apparatus for authentication for a multiplicity of services, comprising:

an authentication server connected to a multiplicity of services, said authentication server including
  a memory storing at least one service-specific access authorization for a service and authentication codes;
  a comparison device connected to said memory for comparing a received authentication code with the authentication codes stored in said memory; and
  a connection setup device for setting up a connection to a requested service.

Other features which are considered as characteristic for the invention are set forth in the appended claims.

Although the invention is illustrated and described herein as embodied in a method and apparatus for authentication for a multiplicity of services, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram illustrating access to a bank server via an electronic payment terminal;

FIG. 3 is a block diagram illustrating access to a police data server via a terminal; and FIG. 4 is a block diagram showing the structure of the authentication server.

DESCRIPTION OF THE PREFERRED EMBODIMENTS

Figure 1:
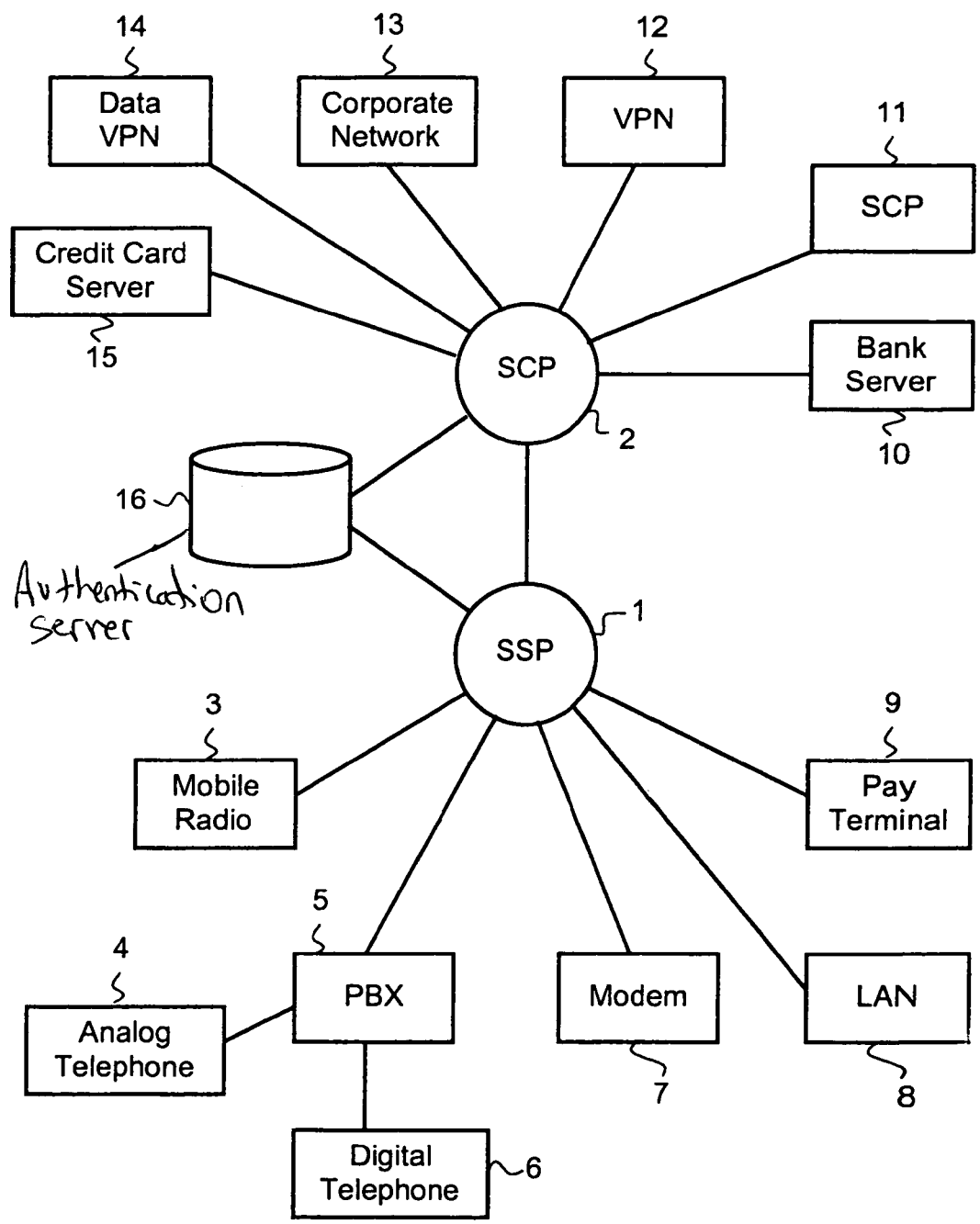
FIG. 1 shows a block diagram illustrating access to different services via different accesses.

Referring now to the figures of the drawing in detail and first, particularly, to FIG. 1 thereof, there is seen a detail of an intelligent network with a service switching point 1 (SSP) and a service control point 2 (SCP).

The service switching point 1 constitutes the interface between the intelligent network and the public telephone network (PSTN: Public Switched Telephone Network). The various services of the intelligent network can be accessed via the service switching point via a multiplicity of different devices.

Such devices may be, for example, a mobile radio telephone 3 or an analog telephone 4 and a digital telephone 6, which are both connected via a private branch exchange (PBX) 5 to the service switching point 1, a computer with a modem 7, a computer with a LAN connection 8 or an electronic payment terminal 9. The above-mentioned list is not exhaustive; further devices for access to services of the intelligent network are conceivable and lie within the invention.

The service switching point 1 is connected to a service control point 2 of the intelligent network. In this case, the service control point 2 performs the services of the intelligent network, the so-called IN services. To that end, the service control point 2 sets up a connection to a service server, which performs a corresponding IN service, and requests the service from the latter.

The following, for example, may be provided as service server: a bank server 10, a universal personal telecommunication SCP 11, a virtual private network 12, a home location register/corporate network 13, a data VPN 14 and a credit card server 15, which are connected to the service control point 2.

Furthermore, an authentication server 16, which is provided for authentication of accesses to the IN services, is connected to the service switching point 1 and to the service control point 2.

If, by way of example, a connection to a bank server 10 is requested via a computer with modem 7 for e.g. a financial transaction, then the service switching point 1 forwards the service request to the authentication server 16, which authenticates the access by comparing an authentication code of a user communicated by the computer with modem 7 with stored authentication codes and requesting the IN service at the bank server 10 via the service control point 2 in the event of a positive comparison result. After successful authentication, there is thus a connection available between the computer with modem 7 and the bank server 10. Access via the computer with modem 7 to an IN service of the credit card server 15, for example, proceeds analogously. The access also proceeds similarly when another device is chosen for the access, for example the mobile radio telephone 3. For this purpose, the mobile telephone transmits the authentication code to the authentication server 16.

In the event of access via a computer, the authentication code may be input by a user by means of the keyboard, or be stored on a SMART card, for example. If an access device has a fingerprint sensor, for example, then the authentication code can be stored as encrypted fingerprint in the authentication server 16, so that a user authenticates himself/herself by his/her fingerprint. To that end, data concerning the fingerprint and also the associated encryption information serving for encrypted transmission of the fingerprint data are stored in the authentication server.

FIG. 2 outlines how a bank server 52 is accessed via an authentication server 51 via an arbitrary terminal 50, for example a computer terminal.

In this respect, the communication of the authentication code from the terminal 50 to the authentication server 51 takes place by means of encrypted transmission. This prevents unauthorized accesses to the authentication code such as, for example, interception measures on the transmission link 53 between the terminal 50 and the authentication server 51. For additionally increased security, the encryption algorithm changes over time. This application is suitable for example for transferring amounts of money to an electronic purse or for payment by credit and/or account card.

The access—illustrated in FIG. 3—to the data of a police data server 102 proceeds similarly. On the one hand, the access is possible without authentication by means of a police terminal 103, which is accessed exclusively by persons authorized to do so, such as police officials, for example; on the other hand, the data of the police data server 102 can likewise be accessed via a terminal 100 and an authentication server 101. This facilitates for example access to police data via a mobile terminal in a police car or by a police patrol. In this case, encrypted transmission 104 between the terminal 100 and the authentication server 101 is again provided.

FIG. 4 outlines the structure of the authentication server. The authentication server has an access authorization memory 150, in which a multiplicity of authentication codes are stored. The services for which a user is authorized are additionally stored for each authentication code. A comparison device 151 compares a communicated authentication code with all the authentication codes stored in the access authorization memory 150 and, in the event of a positive comparison, signals to a connection setup device 152 which service is to be requested.

I claim:

1. A method of authenticating users for using a multiplicity of services each being callable via a defined access authorization, the method which comprises the following steps:
    providing an authentication server and storing in the authentication server at least one access authorization for each of the services;
    storing a multiplicity of authentication codes assigned to users in the authentication server;
    assigning each authentication code to the access authorization or authorizations for at least one service able to be used by the user; and
    upon receiving a request for a given service, carrying out authentication with the authentication server by comparing a received authentication code with the authentication codes stored in the authentication server and, if the comparison leads to a positive comparison result, setting up with the authentication server a connection to the requested service using the stored access authorization having the assigned authentication.

2. The method according to claim 1, which further comprises selecting the access authorization or authorizations of at least one of the users to be at least one of service-specific and subscriber-specific.

3. A method of authenticating users in an intelligent network for using a multiplicity of IN services each being callable via a defined access authorization, the method which comprises the following steps;
    providing an authentication server in a service control point of an intelligent network;
    storing at least one access authorization for each of the IN service in the authentication server;
    storing a multiplicity of authentication codes assigned to users in the authentication server;
    assigning each authentication code to the access authorization or authorizations for the at least one service to be used by the user; and
    upon receiving a request for a given en IN service, carrying out authentication with the authentication server by comparing a received authentication code with the authentication codes stored in the authentication server and, if the comparison leads to a positive comparison result, setting up with the authentication server a connection to the requested service using the stored access authorization having the assigned authentication code.

4. The method according to claim 3, which further comprises selecting the access authorization or authorizations of at least one of the users to be at least one of service-specific and subscriber-specific.

5. An apparatus for authenticating users for using a multiplicity of services, comprising:
    an authentication server connected to a multiplicity of services, said authentication server including
        a memory storing at least one defined access authorization for each of the services and storing assigned authentication codes of users;
        a comparison device connected to said memory for comparing a received authentication code with the authentication codes stored in said memory; and
        a connection setup device for setting up a connection to a requested service using the access authorization having been assigned the received authentication code.

6. The apparatus according to claim 5, which further comprises selecting the access authorization or authorizations of at least one of the users to be at least one of service-specific and subscriber-specific.

* * * * *